United States Patent [19]

Chang et al.

[11] Patent Number: 5,072,226
[45] Date of Patent: Dec. 10, 1991

[54] RADIOMETER SYSTEM INCORPORATING A CYLINDRICAL PARABOLIC REFLECTOR AND MINIMUM REDUNDANCY ARRAY FEED

[75] Inventors: Donald C. D. Chang, Thousand Oaks; Kar W. Yung, Torrance; Samuel C. Reynolds, Los Angeles; Stanley S. Chang, Palos Verdes Estates, all of Calif.

[73] Assignee: Hughes Aircraft Company, Los Angeles, Calif.

[21] Appl. No.: 534,217

[22] Filed: Jun. 7, 1990

[51] Int. Cl.$^5$ .............................................. G01S 3/02
[52] U.S. Cl. ..................................... 342/351; 343/915
[58] Field of Search ................ 342/351; 343/703, 915, 343/DIG. 2

[56] References Cited

U.S. PATENT DOCUMENTS

| | | | |
|---|---|---|---|
| 3,503,072 | 3/1970 | Thompson | 343/915 |
| 3,938,162 | 2/1976 | Schmidt | 343/915 |
| 4,613,870 | 9/1986 | Stonier | 343/915 |
| 4,724,439 | 2/1988 | Wiley et al. | 342/351 |
| 4,814,772 | 3/1989 | Wiley et al. | 342/351 |
| 4,864,309 | 9/1989 | Wiley et al. | 342/351 |
| 4,990,925 | 2/1991 | Edelsohn et al. | 342/424 |

*Primary Examiner*—Theodore M. Blum
*Attorney, Agent, or Firm*—Robert A. Westerlund; Steven M. Mitchell; Wanda K. Denson-Low

[57] ABSTRACT

A radiometer system is disclosed, the system incorporating a cylindrical parabolic reflector and a plurality of radiation sensors disposed along the focal line of the reflector in a minimum redundancy array. Digital processing circuitry is connected to the output of the sensors for digitally processing signals using a cross-correlation signal processing and fast Fourier transform circuitry to generate image signals, the system providing reduced weight and increased signal integration time. Several embodiments of the system are disclosed including analog and digital versions having a multiplicity of antenna configurations.

14 Claims, 5 Drawing Sheets

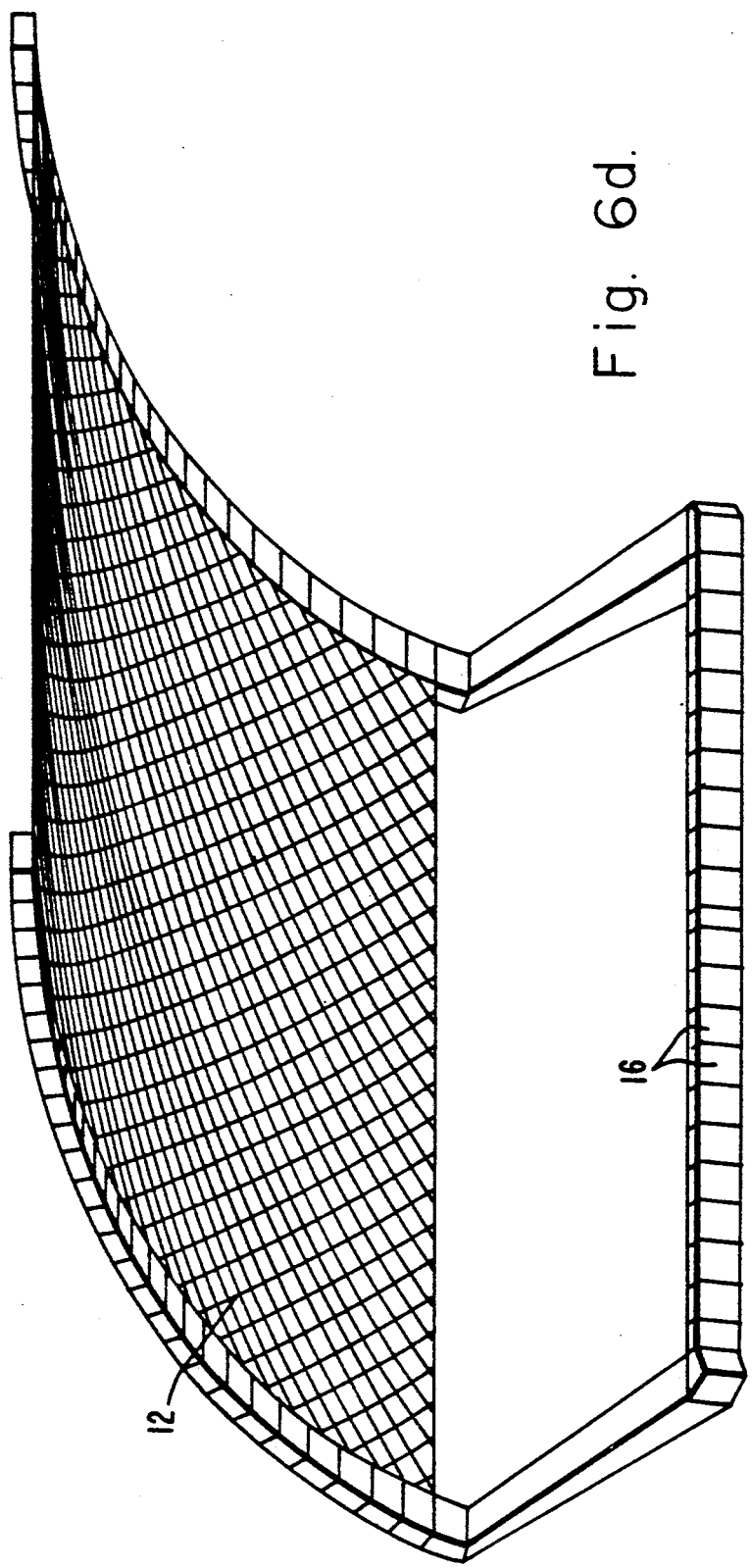

RADIOMETER SYSTEM INCORPORATING A CYLINDRICAL PARABOLIC REFLECTOR AND MINIMUM REDUNDANCY ARRAY FEED

BACKGROUND

The present invention relates to satellite borne radiometers and, more particularly, to a radiometer incorporating a cylindrical parabolic antenna and a minimum redundancy array feed adapted for use on satellites for remote radiometric imaging or mapping.

A radiometer is a well-known device which senses and measures radiant energy. Selection of sensors adapts the radiometer to sense radiation in specific frequency bands, such as infrared and radio frequency bands, for example. Satellite borne radiometers are used for both terrestrial and extraterrestrial mapping. Typically, the satellite traverses an orbit that tracks a specific path that has the area to be mapped. This is accomplished by establishing a specific orbital track or by the relative motion of the satellite to ground. Typically, prior art radiometers scan a single pencil-beam footprint along a conical path by means of a rotating parabolic reflector. Such a radiometer is disclosed in U.S. Pat. No. 4,724,439 to Wiley et. al. Such radiometers, while successful, require the use of a mechanical scanning mechanism, such as a rotating reflector to accomplish the conical scan, thereby adding to the size, weight, and physical complexity of the system. Scanning of the pencil-beam further reduces the available time for integration of the sensed radiation thereby limiting system sensitivity. Accordingly, there has existed a need for an improved radiometer that eliminates the need for complex mechanical systems and increases sensed signal integration time.

SUMMARY OF THE INVENTION

Broadly, the invention is a radiometric imaging system for a satellite or other platform employing a cylindrical parabolic reflector and a minimum-redundancy linear array of sensor elements as the feed. The parabolic reflector is adapted to focus the field-of-view to a single fan beam for each sensor of the array in the cross-track direction. The linear array comprises the feed array for the cylindrical reflector type antenna and lies along the focal line of the cylindrical reflector. The beam of each element is focussed on the same cross-track strip using various phase slopes depending on the location of the element. Cross-track imaging is accomplished within this fan beam field-of-view by means of spatial-frequency component measurement using digital fast Fourier image reconstruction and digital correlation processing methods. The invention combines the concept of a minimum-redundancy array with the cylindrical reflector to achieve push-broom microwave imaging. The system provides high cross-track resolution using spatial-frequency image reconstruction, and along track resolution using real beam formation. This system is designed specifically to replace the current generation of conical-scanning strip-mapping radiometers. Two primary advantages are provided: improved sensitivity due to increased integration time, and the elimination of mechanical scanning mechanisms. In addition, a reflector surface that is curved in only one dimension, a parabolic cylinder, is far simpler to fabricate and deploy than one that is curved in two dimensions, as is a parabolic dish.

Three embodiments of apparatus for implementing the correlation and Fourier reconstruction processing are disclosed. The first and second embodiments use frequency-division multiplexing (FDM) to encode the signals from the individual receive elements, so that they can be transmitted in a single transmission line and correlated simultaneously. The first embodiment utilizes analog correlation with simple mixers and subcarrier, while the second embodiment utilizes single sideband mixers without subcarrier. The cross-correlated signals are then separated according to frequency indexing, which effectively separates them by correlation baseline, and this produces the spatial-frequency spectrum of the scene within the field-of-view. This spectrum is then accumulated and Fourier transformed to generate an image of the scene. The third embodiment digitizes the received signal as early in the process as possible, then digitally performs all processing, including the correlations. Because of low dynamic range and highly oversampled data, the analog to digital conversion requires as little as one bit resolution. Therefore, significant savings in terms of power and weight are achieved.

Accordingly, it is an objective of the present invention to provide an improved radiometric system suitable for use on the next generation of remote sensing vehicles such as, for example, the satellite vehicles used on the U.S. Government space programs identified as NOAA, DMSP and EOS. Another objective of the present invention is the provision of an improved radiometric system for satellites having a long integration time to improve sensitivity. A further objective of the present invention is to provide an improved radiometric system for satellites that does not require or employ a mechanical scanning system. Yet another objective of the invention is the provision of an improved radiometric system for satellites that is compact, light in weight and avoids physical complexity of the imaging system. Still another objective of the invention is to provide an improved radiometer using a cylindrical parabolic antenna and minimum redundancy array to increase signal integration time, eliminate mechanical scanning systems and provide a more easily deployed antenna.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 6a through 6d illustrate a foldable cylindrical parabolic antenna for use in a system of the present invention.

DETAILED DESCRIPTION

Figure 1:
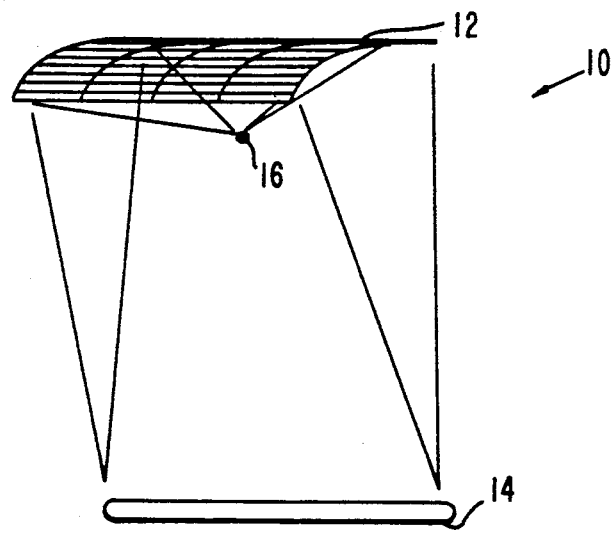
FIG. 1 shows a basic cylindrical parabolic antenna arrangement in accordance with the invention for use in a radiometric imaging system in a space satellite.

Referring now to FIG. 1, there is shown a simplified radiometric imaging system 10. The system 10 comprises a cylindrical parabolic reflector 12. The reflector 12 is disposed in space on a remote sensing vehicle, such as on a satellite platform, for example (not shown). The cylindrical parabolic reflector 12 has a curved surface in only one dimension and is more easily fabricated and deployed than a reflector that is curved in two dimensions such as a parabolic dish. The cylindrical parabolic reflector 12 is adapted to focus the field-of-view 14 of a sensor 16 to a single fan beam in the cross-track direction, and thus provides the along-track resolution of the system.

Figure 2:
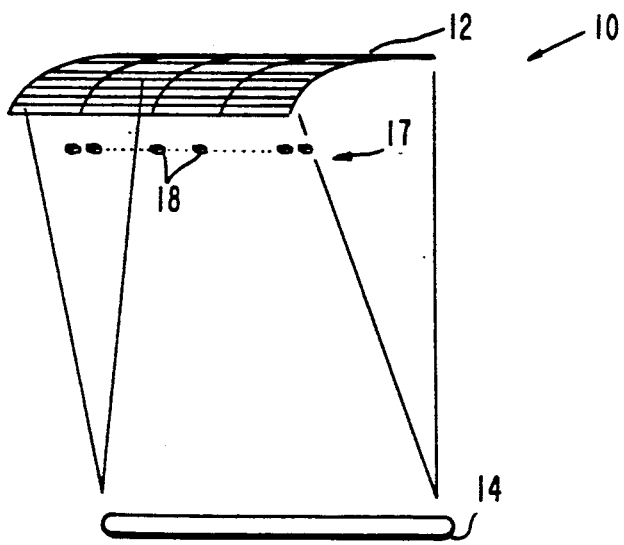
FIG. 2 shows a second embodiment of a radiometric imaging system for use in space incorporating a minimum redundancy sensor element array.

Referring now to FIG. 2, in accordance with the invention, a linear array 17 of sensor elements 18 is disposed along the focal line of the reflector 12. The linear array 17 of sensor elements 18 is of the type known as a minimum redundancy array or a thinned linear array. The basic theory of minimum redundancy arrays is presented, for example, in a technical paper entitled "Minimum-Redundancy Linear Arrays" by Alan T. Moffet, published in the March 1968 issue of the *IEEE Transactions on Antennas and Propagation*, Vol. AP-16, No. 2.

Briefly, there is a class of arrays which achieve maximum resolution for a given number of elements by reducing the number of redundant spacings present in the array. There is a very high degree of redundancy present in uniformly spaced arrays. In an N-element grating or array, unit spacing (equal to $u_0$ wavelengths) is present $N-1$ times, twice-unit spacing $N-2$ times, and so forth out to the maximum spacing of $N-1$ units, which is present just once. Higher resolution is achieved if the the redundant spacings are reduced in number, permitting the length of the array to be increased for the same number of elements. The high degree of redundancy in the array permits a simple feeder arrangement with some modifications if N is not equal to an integral power of two, and produces a directional pattern with desirable low sidelobes. The directional diagram, which has the form $(\sin Nx/N \sin X)^2$, is comblike, with narrow lobes of width $\approx (Nu_0)^{-1}$, which repeat with a grating spacing $\approx u_0^{-1}$. Thus the number of distinct elements that can be resolved in a one-dimensional source distribution is approximately equal to N, and this is obtained when the angular width of the source is equal to the separation between elements. If the source is an object of known size the element spacing is matched to the source size. The unit spacing determines the size of the field over which the array produces an unambiguous picture of the source distribution. For a given number of elements there is an optimum linear array giving maximum resolution. This is obtained by minimizing the number of redundant spacings present in the array. The linear array 17 comprises the feed array for the cylindrical parabolic reflector 12 and lies along the focal line thereof. The beam of each sensor element 18 is focussed on the same cross-track strip or footprint 14. As indicated in FIG. 2, all sensor elements 18 see the same fan-beam footprint 14.

Figure 3:
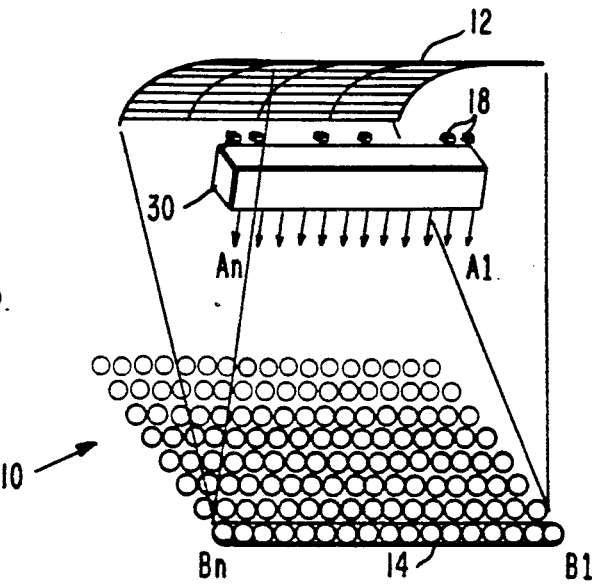
FIG. 3 illustrates the radiometric imaging system showing how the cross-track and along-track image reconstruction is accomplished.

Referring now to FIG. 3, the system 10 comprises a processor 30 for correlation and Fourier reconstruction processing of the radiation signals received by the individual sensor elements 18. Cross-track imaging is accomplished within the fan-beam field-of-view or footprint 14 by means of spatial frequency component measurement and digital Fourier image reconstruction. The spatial frequency components are measured by microwave correlation between the outputs of the various sensor elements 18 of the array 17.

FIG. 3 shows the "pushbroom" coverage in the direction of travel of the footprint 14. In providing correlation and Fourier reconstruction processing, the processor 30 combines the outputs of numerous elements 18 to produce numerous outputs $A_1$ to $A_n$ representing successive fan-beam footprints 14 made up of successive elements $B_1$ to $B_n$. Successive footprints 14 produced along the direction of travel provide the "pushbroom" microwave imaging. The radiometric imaging system 10 of the present invention provides high cross-track resolution using digital spatial-frequency image reconstruction, and along track resolution using real beam formation.

Three embodiments of apparatus for implementing the correlation and Fourier reconstruction processing are disclosed. The first and second embodiments illustrated in FIG. 4 use frequency-division multiplexing (FDM) to encode the signals from the individual receive elements, so that they can be transmitted in a single transmission line and correlated simultaneously. The first embodiment utilizes analog correlation with simple mixers and subcarriers, $f_o$, while the second embodiment utilizes single sideband mixers without subcarrier. In the single sideband embodiment, negative frequency components are eliminated, and therefore the baseband spectrum is distorted due to aliasing. In the double sideband embodiment, negative frequency components do appear in baseband as well. The subcarrier $f_o$ is introduced to minimize the aliasing effect due to negative frequency components. The cross-correlated signals are then separated according to frequency coding, which effectively separates them by correlation baseline, and this produces the spatial-frequency spectrum of the scene within the field-of-view. This spectrum is then accumulated and Fourier transformed to generate an image of the scene. The third embodiment shown in FIG. 5 digitizes the received signal as early in the process as possible, then digitally performs all processing, including the correlations.

Figure 4:
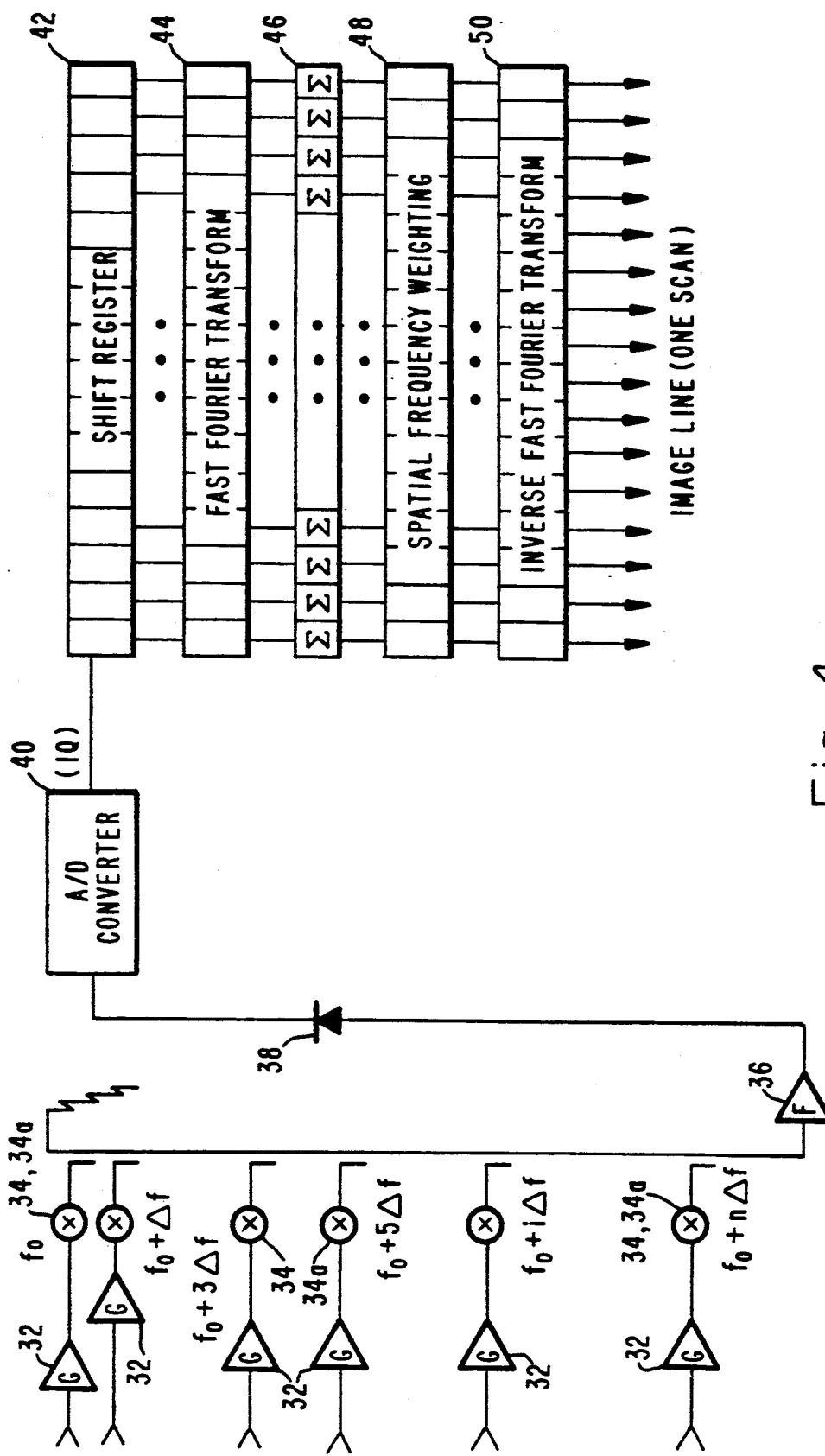
FIG. 4 shows a schematic diagram of one embodiment of a processor for providing correlation and Fourier reconstruction of a microwave image.

Referring now to FIG. 4, there is shown a first embodiment of the processor 30 for providing correlation and Fourier reconstruction processing of signals to provide microwave correlation and digital image reconstruction. Each sensor element 18 of the linear array 17 is coupled through an amplifier 32 to a mixer 34. Simple RF mixers 34 are used. The outputs of elements 18 are heterodyned with a plurality of signals of frequency $f_0 + n\Delta f$ to produce the spatial frequency signal. The resulting intermediate frequency signals are amplified in an IF amplifier 36 and applied to a square-law detector 38. The signal output from detectors 38 is then applied to an analog-to-digital converter 40, and the digital signals are applied to a shift register 42. A fast Fourier transform (FFT) unit 44 then takes the fast Fourier transform of the signals and separates the baselines by FFT into $i\Delta f$ bins 46. A weighting unit 48 then applies spatial frequency weighting. Finally, an inverse FFT unit 50 takes the output of the accumulated $i\Delta f$ bins 46 from the weighting unit 48 and inversely transforms the signals to generate a scan line. In a typical satellite application the result is an integration time of approximately 4 seconds. This is a significant improvement over conical mechanical scan systems where the scan speed is a function of both satellite track speed and conical scan speed providing integration times in the order of seconds.

Referring again to FIG. 4, a second embodiment of the processor 30 is identical to that of the first embodiment except that the mixers 34a are single sideband mixers to generate a group of single sideband signals instead of the simple RF mixers 34 described above, and $f_o$ is set to zero frequency. This embodiment uses frequency-division multiplexing (FDM) to encode the signals from the individual receive sensor elements 18, which are transmitted in a single transmission line and correlated simultaneously. The cross-correlated signals are then separated according to frequency coding, which effectively separates them by correlation baseline; this yields the spatial-frequency spectrum of the scene within the field-of-view. This spectrum is then accumulated and Fourier transformed as above to generate an image of the scene.

Figure 5:
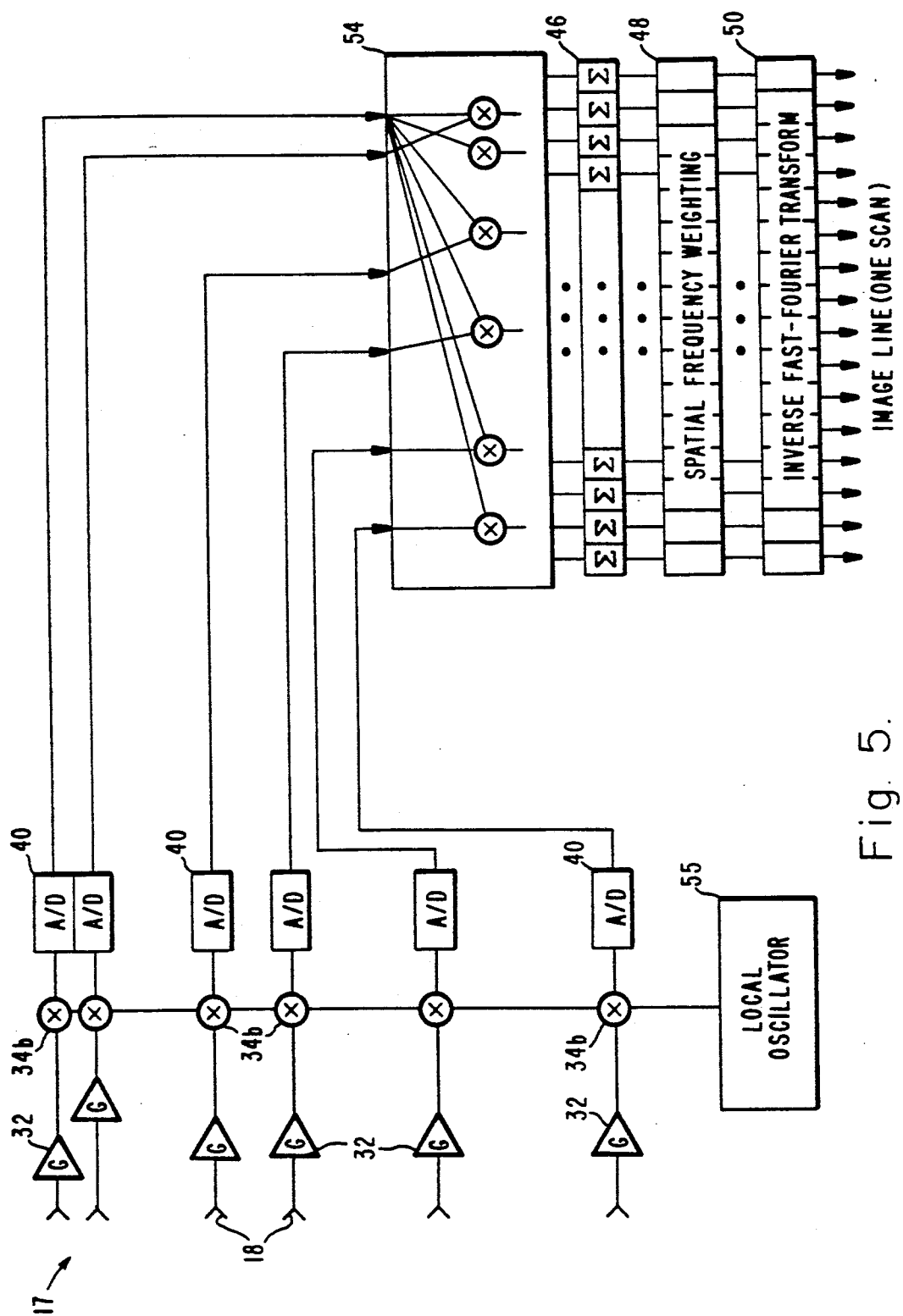
FIG. 5 is a third embodiment of a microwave signal processor.

Referring now to FIG. 5 of the drawings, there is shown a third embodiment of the processor 30 that provides microwave correlation and digital image reconstruction. This embodiment provides digital correlation, whereas the two previous embodiments provided analog correlations, one employing frequency indexing with subcarrier, and the other employing frequency indexing without a subcarrier. This requires more complicated modulators at each receive element, but ultimately yields better performance. In this embodiment, the simple mixers 34b operate from a common local oscillator source 55. The output of each mixer 34b is applied directly to an analog to digital converter 40. The digitized signals are then cross correlated in a cross-multiplier 54. The cross-multiplier 54 performs $n(n-1)/2$ complex correlations which represents all possible cross-multiplications of the digitized signals. Reconstruction of the image signal is as above.

In the embodiment of FIG. 5, the analog-to-digital conversion yields complex data. Cross-correlation generates spatial frequency samples. Spatial frequency bins are accumulated, then inverse transformed to generate the scan line. This embodiment employs very high speed analog-to-digital converters to sample the signals at the intermediate frequency.

Figure 6C:
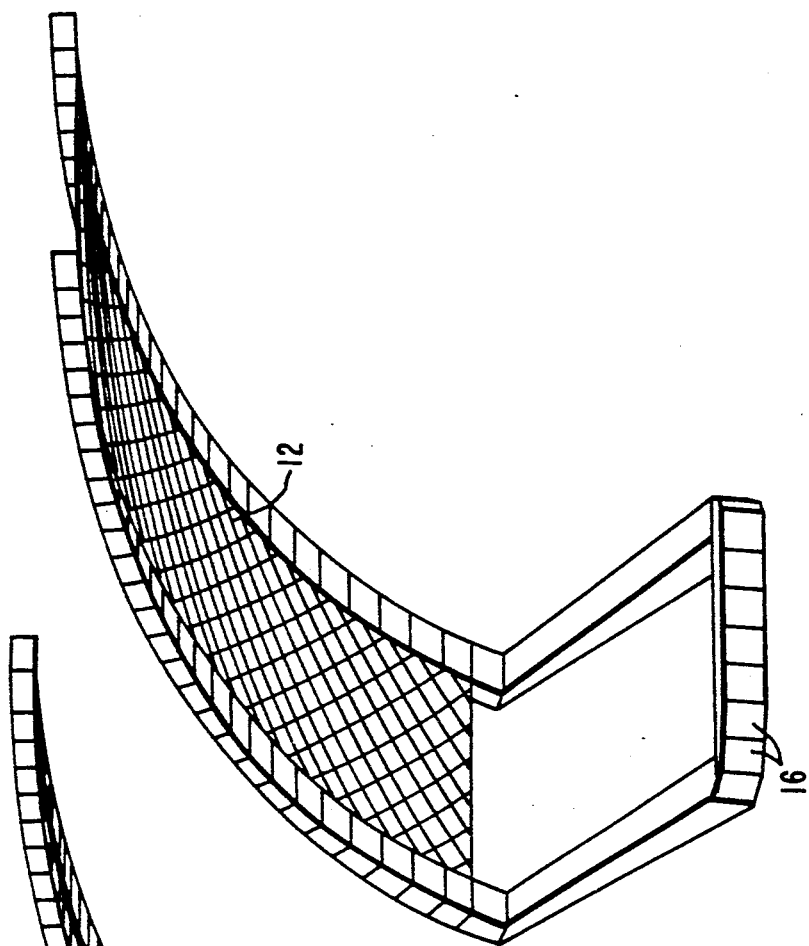
Figure 6B:
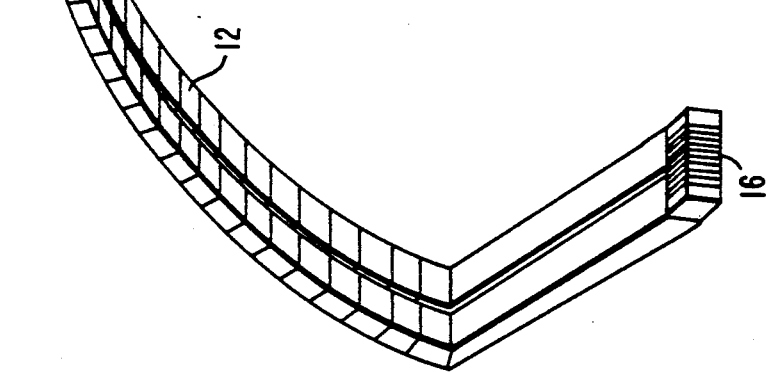
Figure 6A:
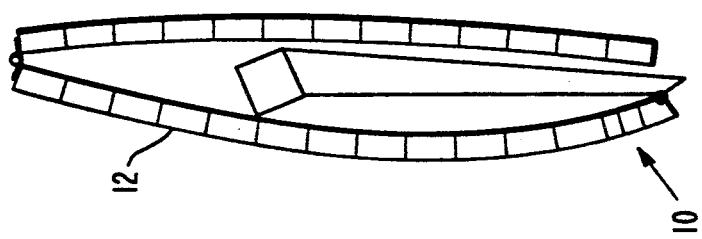

Referring now to FIGS. 6a through 6d, there is shown a representative folding cylindrical parabolic reflector 12 suitable for use with the invention. The reflector 12 is initially transported in a folded state as shown in FIG. 6a. When the transporting satellite is on station, the reflector 12 unfolds in a sequence as shown in FIGS. 6b, 6c, and 6d. The array sensor 16 is also carried in a folded configuration and extends in synchronization with unfolding of the reflector 12.

Thus there has been described a new and improved radiometric system suitable for use on remote sensing vehicles such as, for example, the satellite vehicles used on the U.S. Government space programs identified as NOAA, DMSP and EOS. This improved radiometric system has a long integration time that does not limit the sensitivity. The radiometric system of the present invention does not require or employ a mechanical scanning system and is compact and light in weight because it avoids physical complexity of the imaging system.

It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A radiometer comprising:
    a cylindrical parabolic reflector having a focal line;
    an array of radiation sensors disposed in a minimum redundancy array along the focal line of the reflector, whereby each of the sensors is focussed on a common cross-track fan-beam footprint;
    means for adjusting the phase slope of each of the sensors to scan a common linear beam track within the fan-beam footprint;
    means for transporting the reflector along a track perpendicular to the focal line, to thereby produce successive fan-beam footprints in the direction of travel of the reflector; and
    digital processing means adapted to receive the output of the sensors for spatial-frequency correlating the output of the sensors to generate an image signal, whereby cross-track resolution is achieved by way of digital spatial-frequency image reconstruction, and along-track resolution is achieved by way of pushbroom real beam coverage in the direction of travel of the reflector.

2. The radiometer of claim 1 wherein the reflector is a folding antenna assembly adapted to be carried on a satellite platform.

3. The radiometer system of claim 1 wherein the digital processing means includes a radio requency mixer means connected to receive the output of each of the sensors, for reducing the individual output signals of the sensors to a group of intermediate frequency signals and a group of local oscillator signals of base frequency plus an integral multiple of predetermined frequency increment.

4. The radiometer system of claim 3 wherein the digital processing means further includes a square-law correlation detector connected in common to receive the intermediate frequency signals for generating a plurality of detected correlated signals.

5. The radiometer system of claim 4 wherein the digital processing means further includes analog-to-digital converter means connected to receive the correlated signals output from the correlation detector for generating a digital signal corresponding to the correlation of signals.

6. The radiometer system of claim 5 wherein the digital processing means further includes fast Fourier transform means connected to the shift register for performing a fast Fourier transform of the correlation signals.

7. The radiometer system of claim 6 wherein the digital processing means further includes means for spatial-frequency weighting the outputs of the fast Fourier transform means.

8. The radiometer system of claim 7 wherein the digital processing means further includes inverse fast Fourier transform means connected to receive the output of the spatial-frequency weighting means for generating a plurality of spatial-frequency weighted signals corresponding to the correlated signals.

9. The radiometer system of claim 7 wherein the digital processing means further includes inverse fast Fourier transform means connected to receive the frequency weighted output signals from the spatial weighting means for generating image signals therefrom.

10. The apparatus of claim 3 wherein the mixers include a balanced modulator means for generating the intermediate frequency signals, the intermediate frequency signals being single side band signals.

11. The apparatus of claim 3 wherein the digital processing means includes an analog-to-digital converter connected to the output of each of the mixers for generating a plurality of complex digital frequency output signals corresponding to the output signals of the mixers.

12. The system of claim 11 wherein the digital processing means further includes cross-correlation means for cross-correlating all possible combinations of the analog-to-digital converter means output signals, the cross-correlated signals being spatial frequency signals.

13. The system of claim 12 wherein the digital processing means further includes means connected to the output of the cross-correlation means for spatial-frequency weighting across correlated signals.

14. The system of claim 13 wherein the digital processing means further includes inverse fast Fourier transform means connected to the output of the spatial-frequency weighting means for regulating a plurality of image signals corresponding thereto.

* * * * *